(12) United States Patent
Auyeung (10) Patent No.: US 7,027,510 B2
(45) Date of Patent: Apr. 11, 2006

(54) METHOD OF ESTIMATING BACKWARD MOTION VECTORS WITHIN A VIDEO SEQUENCE

(75) Inventor: Cheung Auyeung, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 614 days.

(21) Appl. No.: 10/112,623

(22) Filed: Mar. 29, 2002

(65) Prior Publication Data

US 2003/0185304 A1    Oct. 2, 2003

(51) Int. Cl.
*H04N 7/12* (2006.01)
(52) U.S. Cl. .................. 375/240.16; 382/236; 348/699
(58) Field of Classification Search ........... 375/240.02, 375/240.13, 240.14, 240.15, 240.16, 240.23, 375/240.24; 382/107, 236; 348/699
See application file for complete search history.

(56) References Cited

U.S. PATENT DOCUMENTS

| 5,347,308 | A |   | 9/1994  | Wai |
|-----------|---|---|---------|-----|
| 5,614,954 | A | * | 3/1997  | Jung ..................... 375/240.14 |
| 5,699,128 | A |   | 12/1997 | Hayashi |
| 5,786,860 | A | * | 7/1998  | Kim et al. ............. 375/240.15 |
| 5,825,421 | A |   | 10/1998 | Tan |
| 6,219,436 | B1| * | 4/2001  | De Haan et al. ............ 382/107 |
| 6,654,420 | B1| * | 11/2003 | Snook ................... 375/240.16 |

* cited by examiner

*Primary Examiner*—Gims Philippe
(74) *Attorney, Agent, or Firm*—John P. O'Banion

(57) ABSTRACT

A method of speeding the computation of backward motion vector estimates which are derived from fields which are available from forward motion vector estimates as based on nearest neighbor criterion. The method allows for the generation of multi-frame backwards motion vectors. The invention of the present method for estimating backward motion vectors is particularly well-suited for use with the MPEG-2 video standard.

30 Claims, 11 Drawing Sheets

METHOD OF ESTIMATING BACKWARD MOTION VECTORS WITHIN A VIDEO SEQUENCE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to motion estimation within video sequences, and more particularly to a method of estimating backward motion vectors from forward motion vectors.

2. Description of the Background Art

Figure 1:
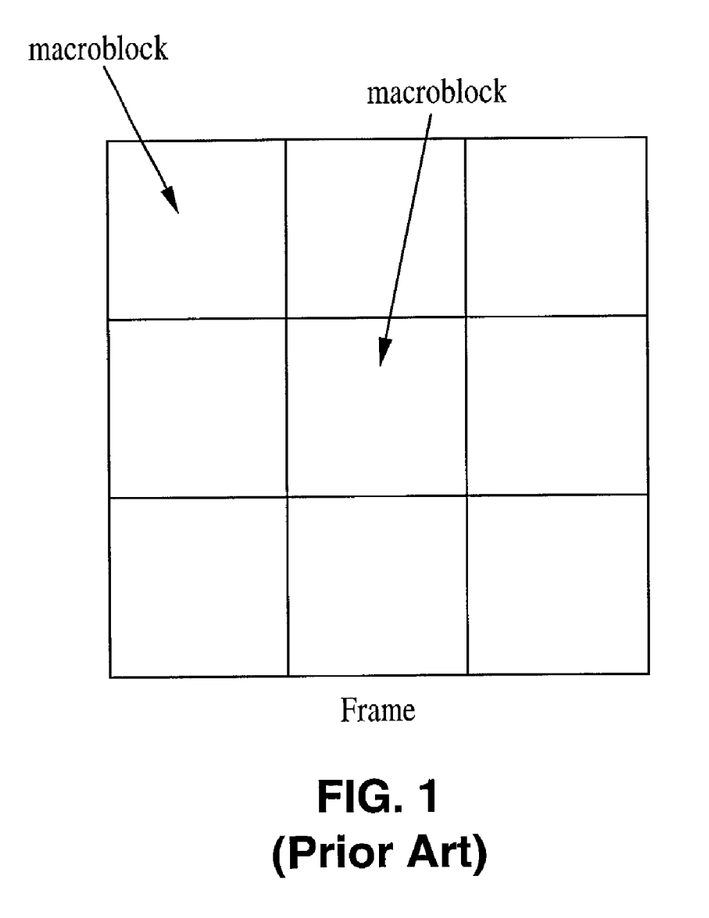
FIG. 1 is a video frame diagram showing that a frame may be divided into a multiplicity of macroblocks, each comprising 16×16 pixels as found in MPEG-2.

The efficiency with which video may be encoded and decoded is critical to the cost effective implementation of a number of video systems, in particular those applications that require real-time encoding or decoding of video. A video frame diagram is exemplified in FIG. 1 being divided into a multiplicity of macroblocks, although only nine are shown by way of example for the sake of simplicity. Each macroblock comprises a number of pixels, such as a 16×16 macroblock of pixels as utilized within MPEG-2 for frame motion vectors. The use of MPEG-2 encoding for video signals has been increasing steadily.

It will be appreciated, that the estimation of motion within a video sequence, such as encoded within an MPEG-2 format, is a computationally intensive process. By way of example, with CCIR 601 video, about 90% of the required computation within an encoder for ISO MPEG-2 is for estimating motion. The time required to encode the video can be a large multiple of the time required to decode the given video sequence. In particular, an encoder implemented as an ISO MPEG-2 technical report encoder based on Test Model 5 (TM5) requires approximately 100 times the CPU execution time on an Ultra-SPARC 80 to encode a video sequence with a horizontal search range of +/−63 pixels and vertical search range of +/−32 pixels than is required in the corresponding decoding process. As a result, although real-time decoding of MPEG-2 video has become feasible, real-time encoding still poses a challenge.

Figure 2:
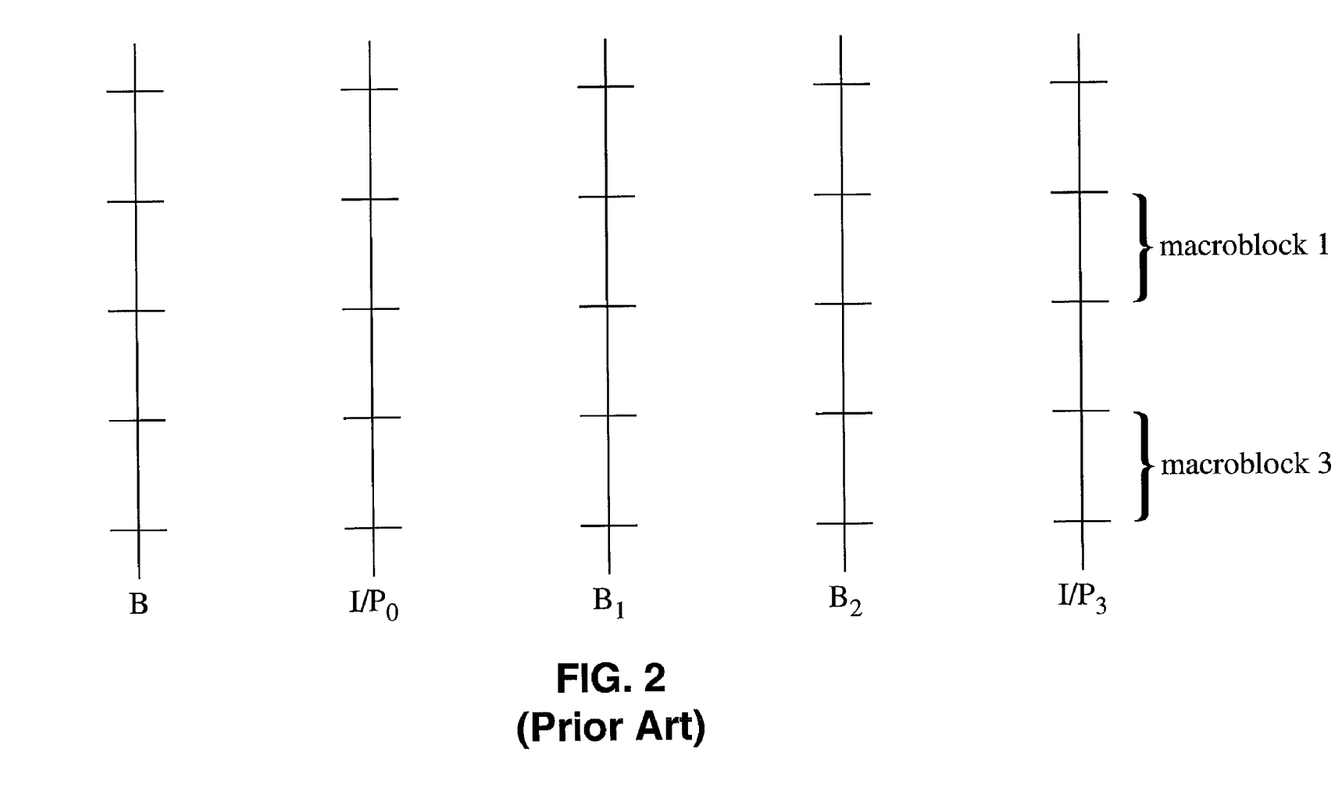
FIG. 2 is a macroblock vector diagram illustrating the conventional availability of two B pictures between successive I/P pictures.

To appreciate the computational intensity, it should be recognized that MPEG-2 is a hybrid type of lossy coding scheme utilizing intra-coding and inter-coding in which redundant information contained in both the spatial domain and the temporal domain are removed to facilitate compression. Intra-coding is the compression performed on the image data in the spatial domain to generate an I-picture, also referred to as an intra-picture. Inter-coding is compression performed in the time domain to create predicted pictures, P-pictures, and bi-directional, B-pictures. Motion vectors for B-pictures may only be generated after computing forward and backward motion vectors for the preceding P-pictures and I-pictures. The I-pictures are independently encoded in relation to other near pictures, such as framing signals or field signals, while the P-pictures encode predicted and interpolated movement in response to the movement of elements from previous I-pictures and P-pictures. The B-pictures are encoded as difference signals for predicted or interpolated movements whose encoding considers the motion within previous and upcoming pictures which may be encoded only after considering the correlation of the movement of the previous I-pictures and P-pictures. The encoding mode which provides the lowest prediction error rate within the modes of forward, reverse, along with forward and reverse, is selected for use in the B-pictures. Typically, the picture structure utilized according to MPEG-2 follows a pattern I, B, B, P, B, B, P, an example of which is shown in FIG. 2 and referred to herein a macroblock vector diagram.

The frames, pictures, within a video sequence, such as within the MPEG-2 standard, are grouped together to form a group-of-pictures (GOP). A popular GOP structure described in MPEG-2 Test model 5 (TM4) is specified by the integer M and N. In TM5, the value N expresses the number of pictures in a GOP and M−1 is the number of B frames between two successive I or P frames. One typical value that may be utilized for M is three, which corresponds to having two B pictures between successive I or P pictures as was shown in FIG. 2 illustrating macroblock 1 and macroblock 3.

Figure 3:
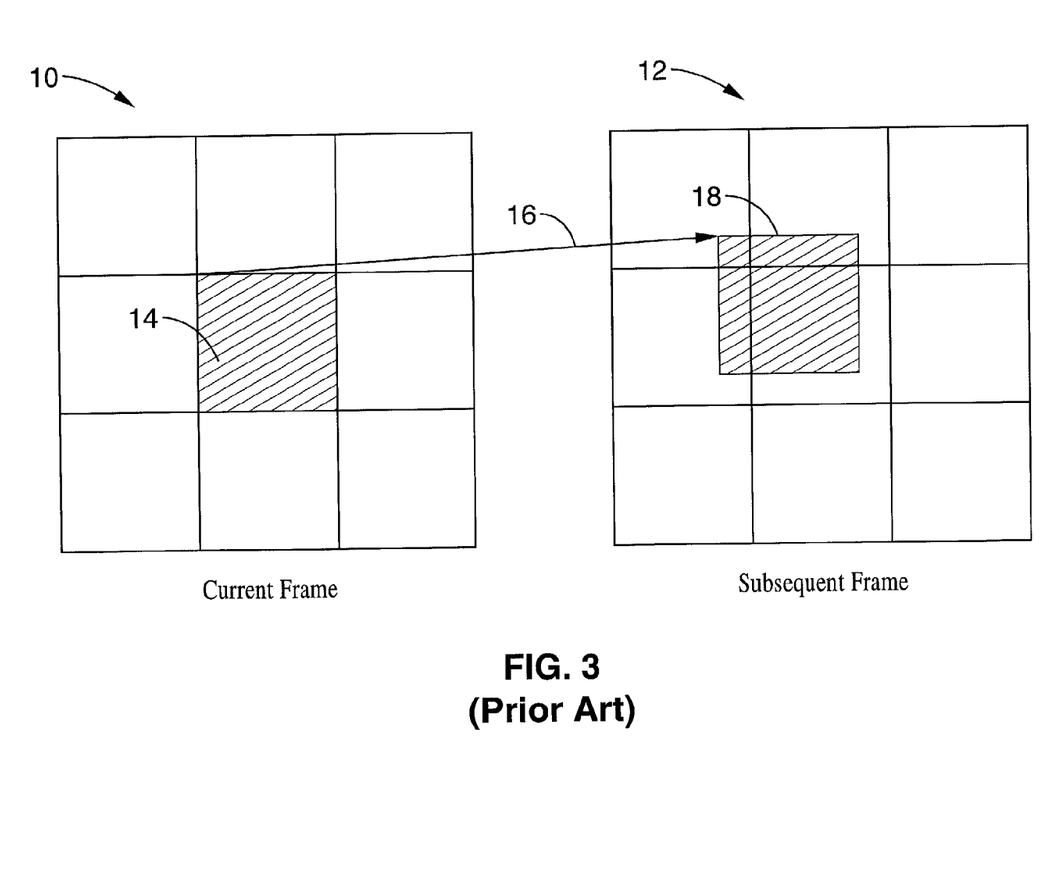
FIG. 3 is a video frame diagram showing a macroblock in a current frame moving from a location in a subsequent frame by backward motion vector.
Figure 4:
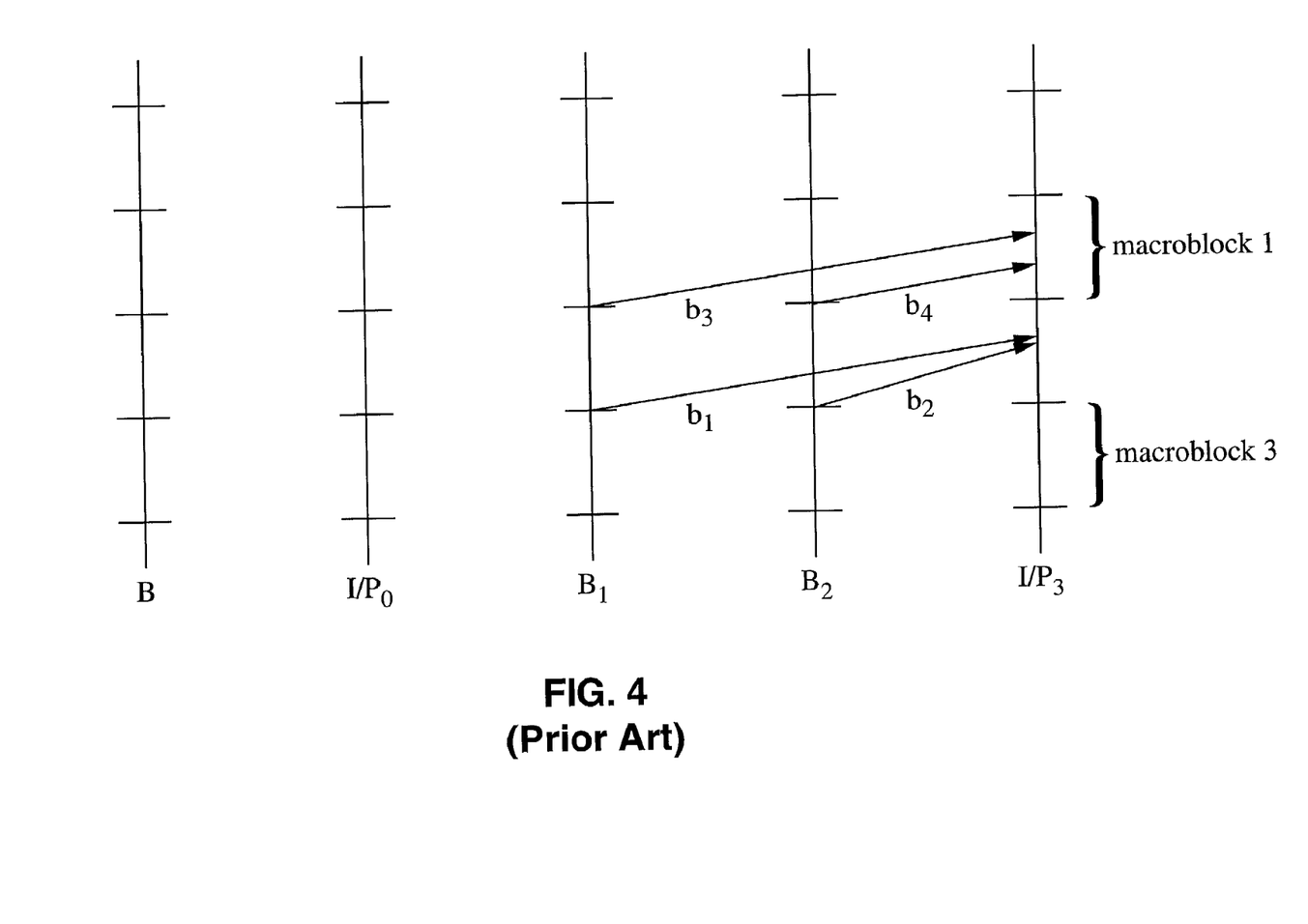
FIG. 4 is a macroblock vector diagram showing a set of backward motion vectors such as for FIG. 3.
Figure 5:
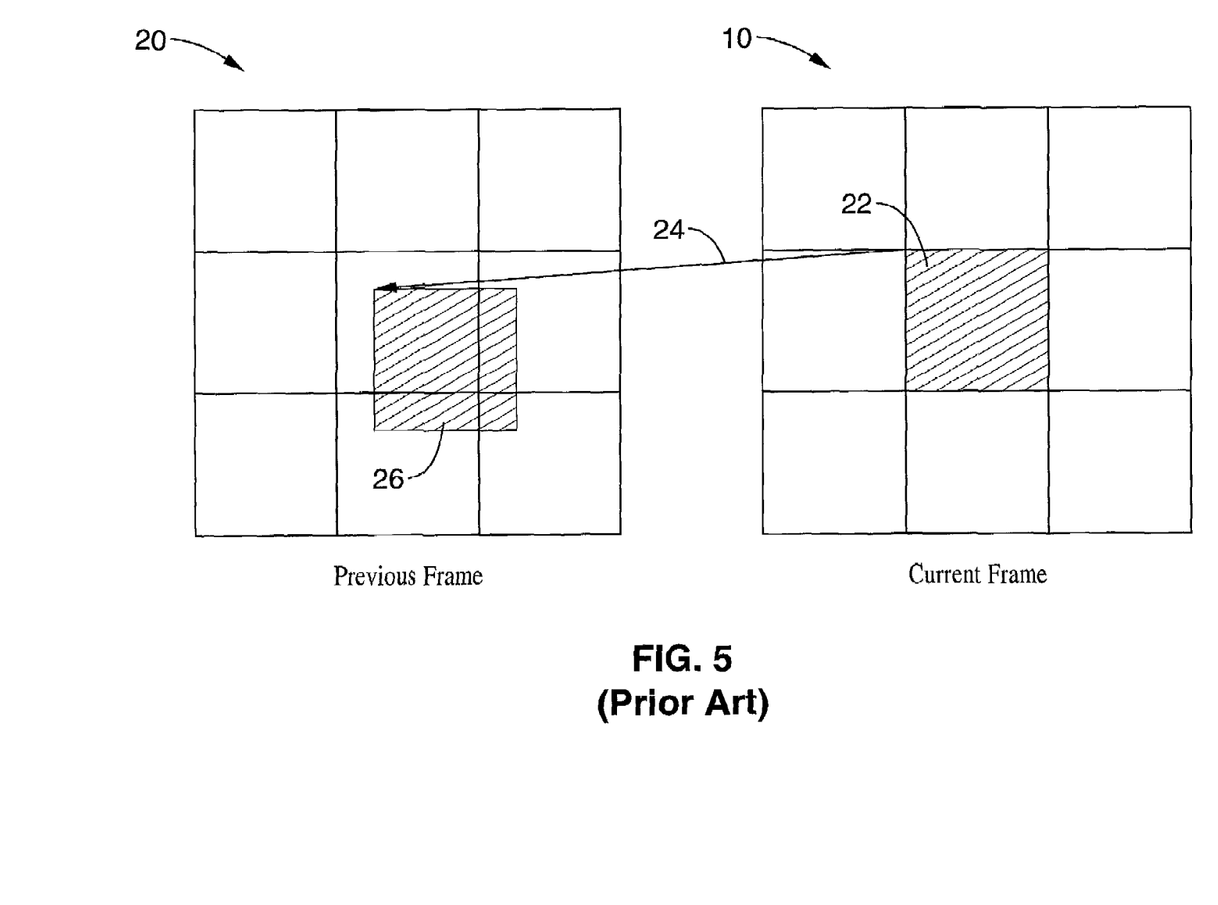
FIG. 5 is a frame diagram showing a macroblock in the current frame moving from a location in a previous frame by a forward motion vector.
Figure 6:
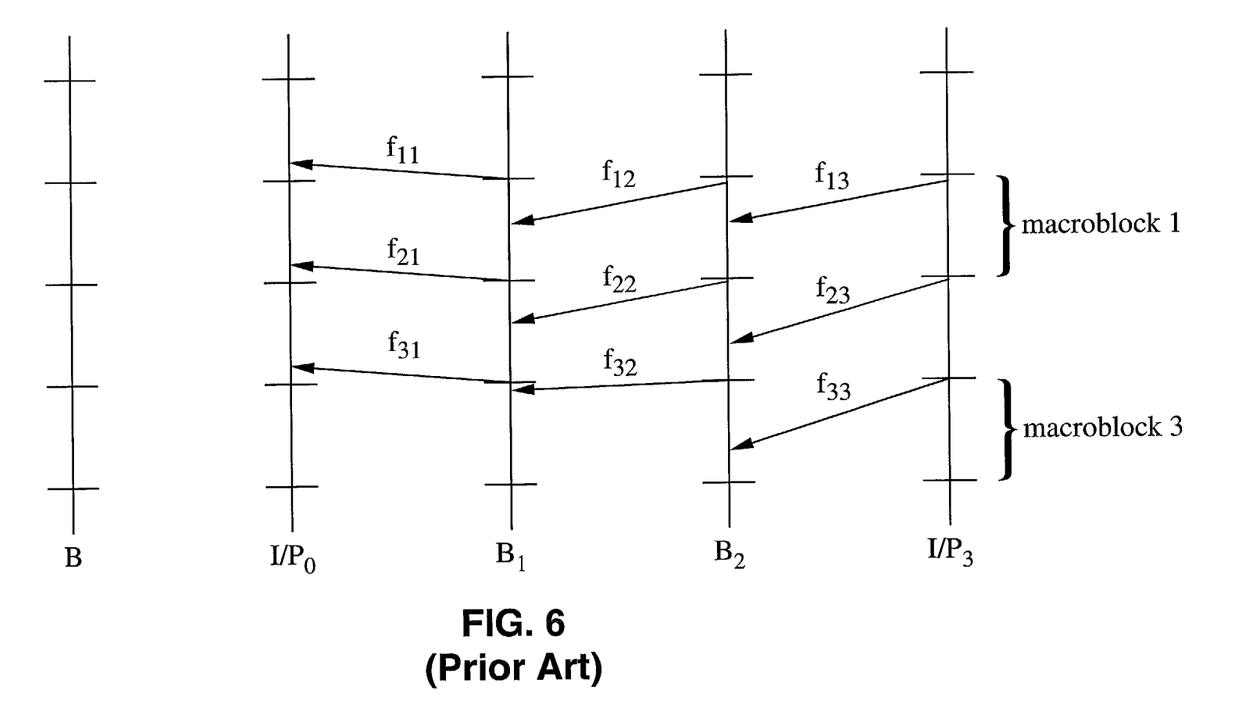
FIG. 6 is a macroblock vector diagram of conventional single-frame distance forward motion vectors.

The macroblocks may be displaced in moving forward or backward in the frame sequence. FIG. 3 depicts a current frame 10 and a subsequent frame 12 wherein macroblock 14 in current frame 10 which has moved from a location 18 in a subsequent frame by the backward motion vector 16. The corresponding motion vectors are represented in FIG. 4 as $B_1$, $B_2$, $B_3$, $B_4$. Depicted in FIG. 5 is a frame diagram of current frame 10 and a previous frame 20, wherein macroblock 22 in current frame 10 moves from a location 26 in previous frame 20 by a forward motion vector 24. FIG. 6 is a macroblock vector diagram of the conventional single-frame distance forward motion vectors associated with the frame shown in FIG. 5.

In the case of TM5 with M=3, an encoder is required to compute the motion vectors $B_1$, $B_2$. If the encoder uses a search window of H×V pixels to find the motion vectors $B_2$, and if it is assumed that the search window size scales with the frame distance between two pictures, then the computational complexity for the motion vectors $B_1$ and $B_2$ using full search is about H×V+4(H×V)=5(H×V), while the memory complexity is approximately 4(H×V).

A number of motion estimation methods have been devised to speed the computations within the encoding process. These methods generally must be utilized in combination to achieve the performance gains necessary to provide for real-time encoding with sufficient picture quality. For example, if method "A" can speed up the computations by a factor of five, and method "B" can speed up computations by a factor of two, and the computation methods are orthogonal, then the combined methods can result in a factor of ten speed increase. It will be appreciated that utilizing a combination of non-orthogonal methods will reduce the attainable increase in speed.

Therefore, a need exists for a method of increasing motion estimation speed that may be beneficially applied in combination with other motion estimation enhancements. The present invention satisfies those needs, as well as others, and overcomes the deficiencies of previously developed motion estimation methods.

BRIEF SUMMARY OF THE INVENTION

A motion estimation method is provided which eliminates a significant amount of the computation associated with backwards motion estimation when forward motion vector fields between successive fields are available.

The computations of both forward and backward vectors are generally performed during the encoding process. The present invention has recognized that a generally parallel relationship exists between the respective forward and backward motion vectors and provides a method for simplifying the computation of the backward motion vectors when the forward motion vectors are available, thereby reducing overall computational overhead. Furthermore, the present method remains generally orthogonal to current speed enhancement methods, wherein the full speed advantages of the technique are available.

Estimation of backwards motion within the present invention is predicated on the use of an nearest neighbor criterion and the fact that relative forward motion of an object in one picture will be parallel to its relative backward motion in the previous frame. So that by analyzing the forward motion vectors, the reverse motion vectors can often be more readily estimated.

An object of the invention is to provide for rapid backwards motion vector computations utilizing information about the computed forward motion vectors.

Another object of the invention is to provide a backwards motion vector estimation method that is orthogonal to conventional vector computation speed enhancement methods.

Another object of the invention is to provide a method which increases the speed of backward motion vector computation for various MPEG-2 and other encoding and decoding operations and which makes real-time MPEG-2 encoding feasible.

Another object of the invention is to provide a method of estimating backward motion vectors for macroblocks that can be linked to successive frames within a multi-frame video sequence.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 7 through FIG. 11. It will be appreciated that the apparatus may vary as to configuration and as to details of the parts, and that the method may vary as to the specific steps and sequence, without departing from the basic concepts as disclosed herein.

Figure 8:
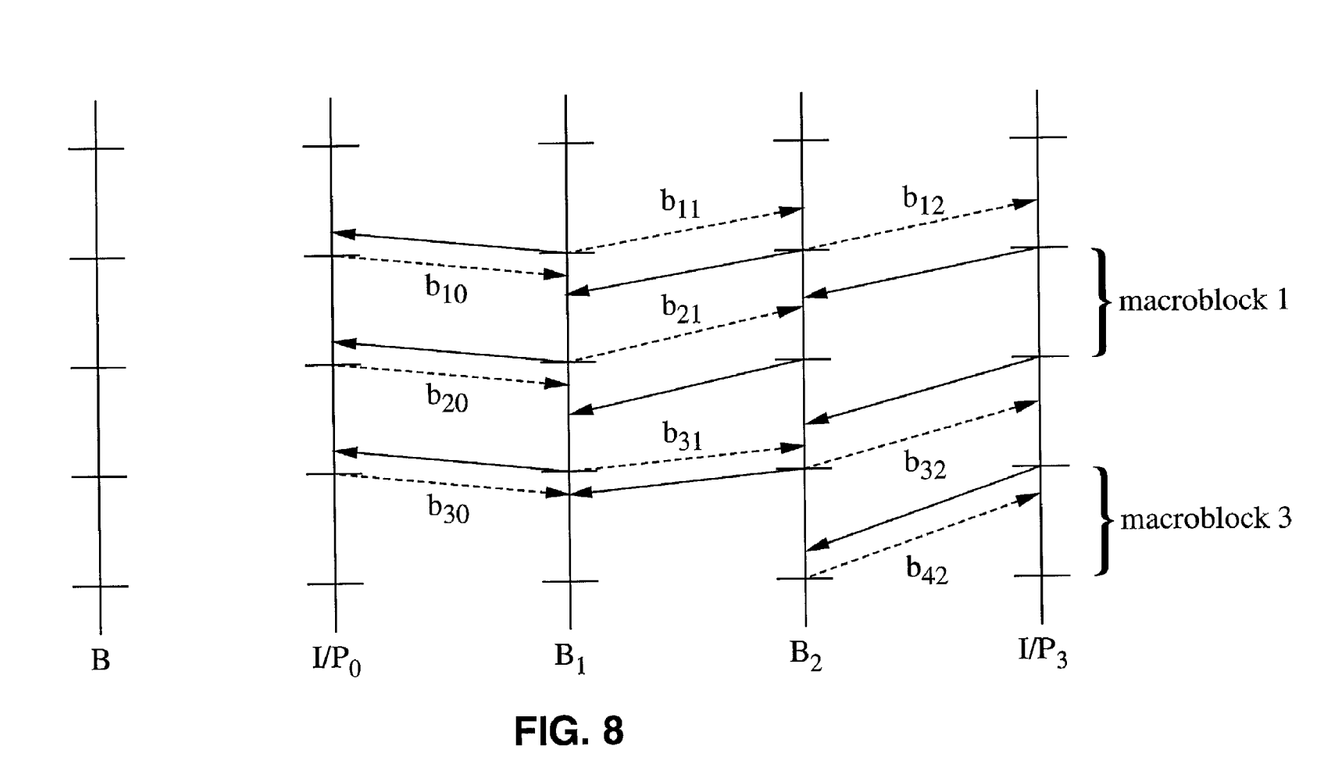
FIG. 8 is a macroblock vector diagram depicting single frame distanced backward motion vectors being derived from single frame distanced forward motion vectors based on the nearest macroblock criterion according to an aspect of the present invention.
Figure 9:
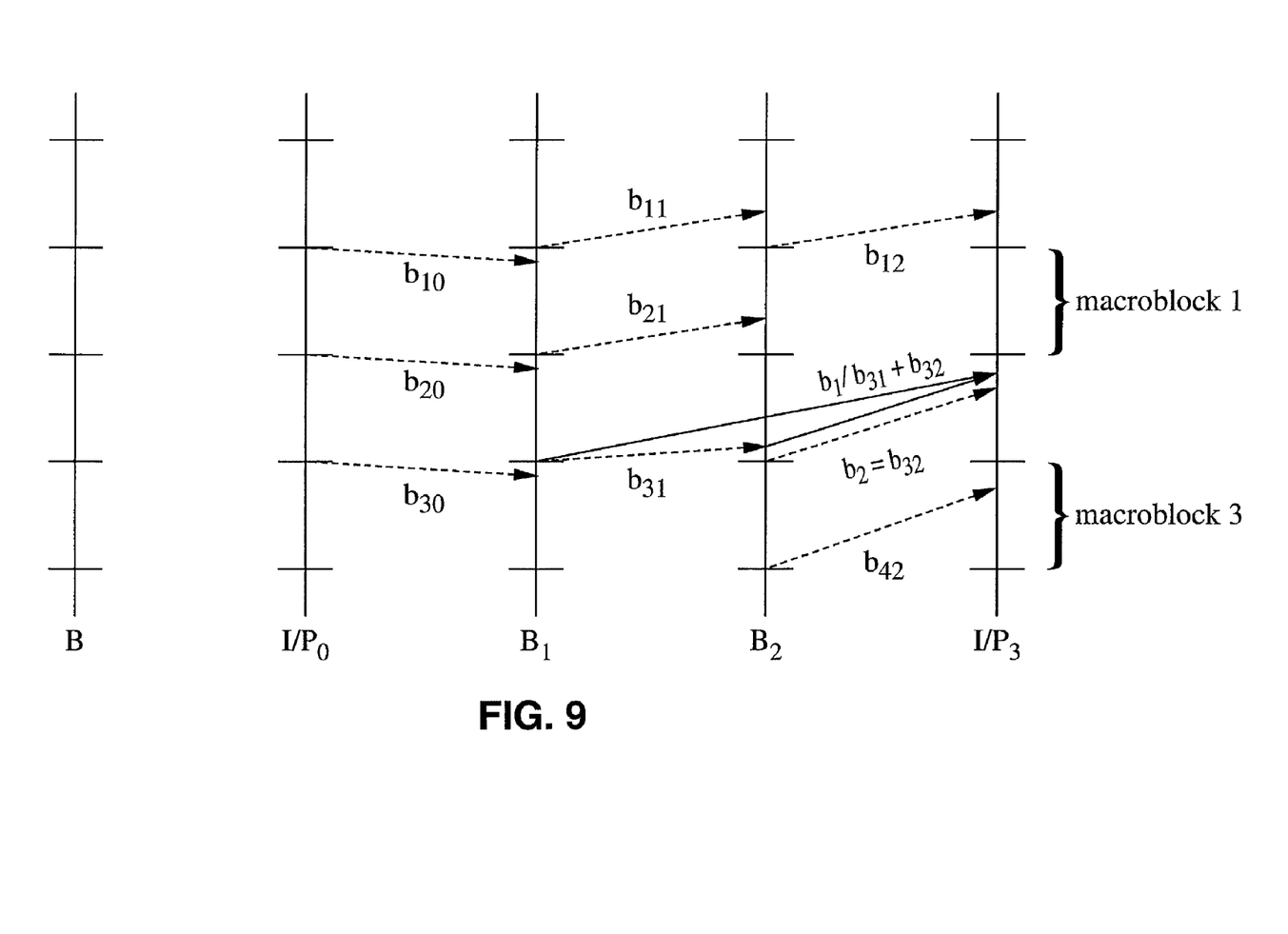
FIG. 9 is a macroblock vector diagram illustrating linking of single-frame backward motion vectors to form multi-frame backward motion vectors according to an aspect of the present invention.
Figure 10:
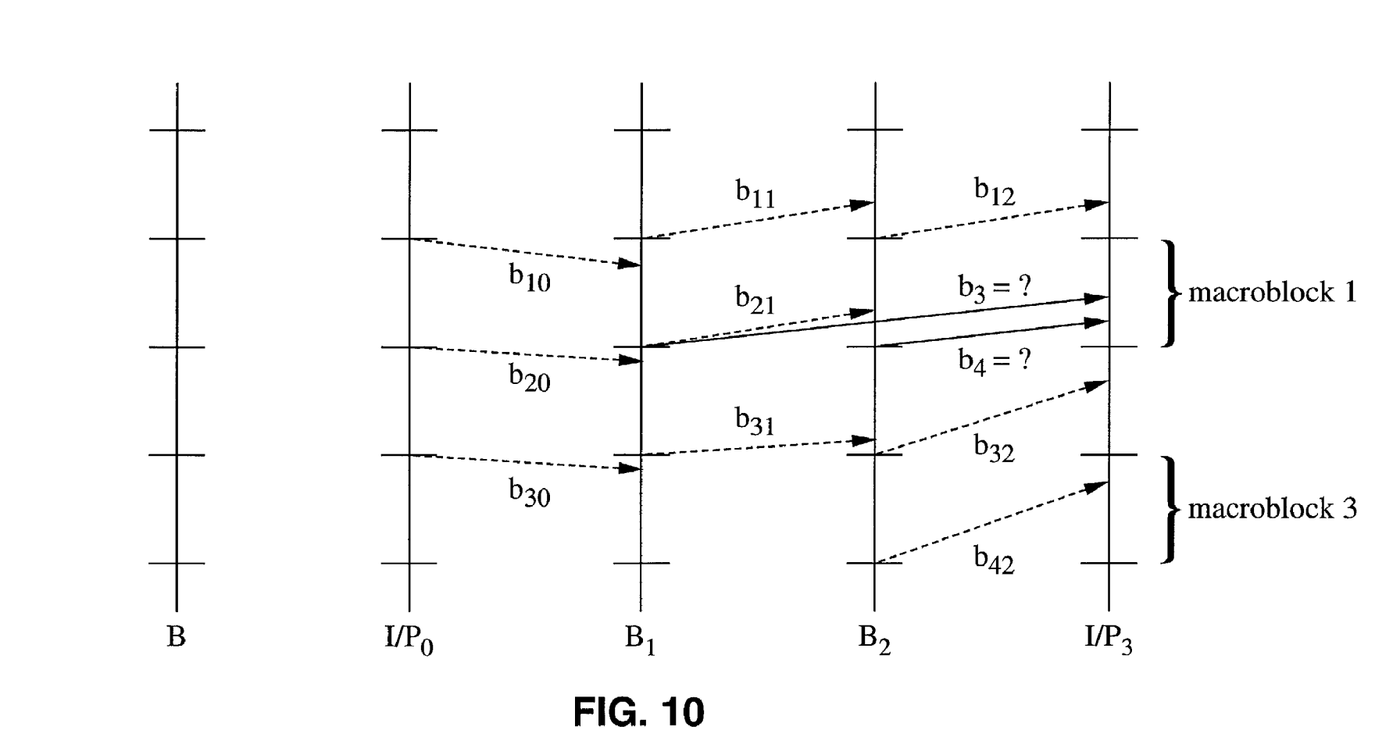
FIG. 10 is a macroblock vector diagram illustrating when backward motion vectors, such as $b_3$ and $b_4$, according to the present invention are not obtainable from the forward motion vectors.

The computation involved in the generation of backward motion vectors can be significantly reduced by utilizing the method of the present invention when the forward motion vector fields are available between successive frames, as was shown in FIG. 6. This reduction is achieved by deriving the single frame distanced backward motion vectors from the nearest neighbor single frame distanced forward motion vectors as shown in FIG. 7 and FIG. 8, and then by linking the single frame distanced backward motion vectors to multiple frame distanced backward motion vector as shown in FIG. 9.

Figure 7:
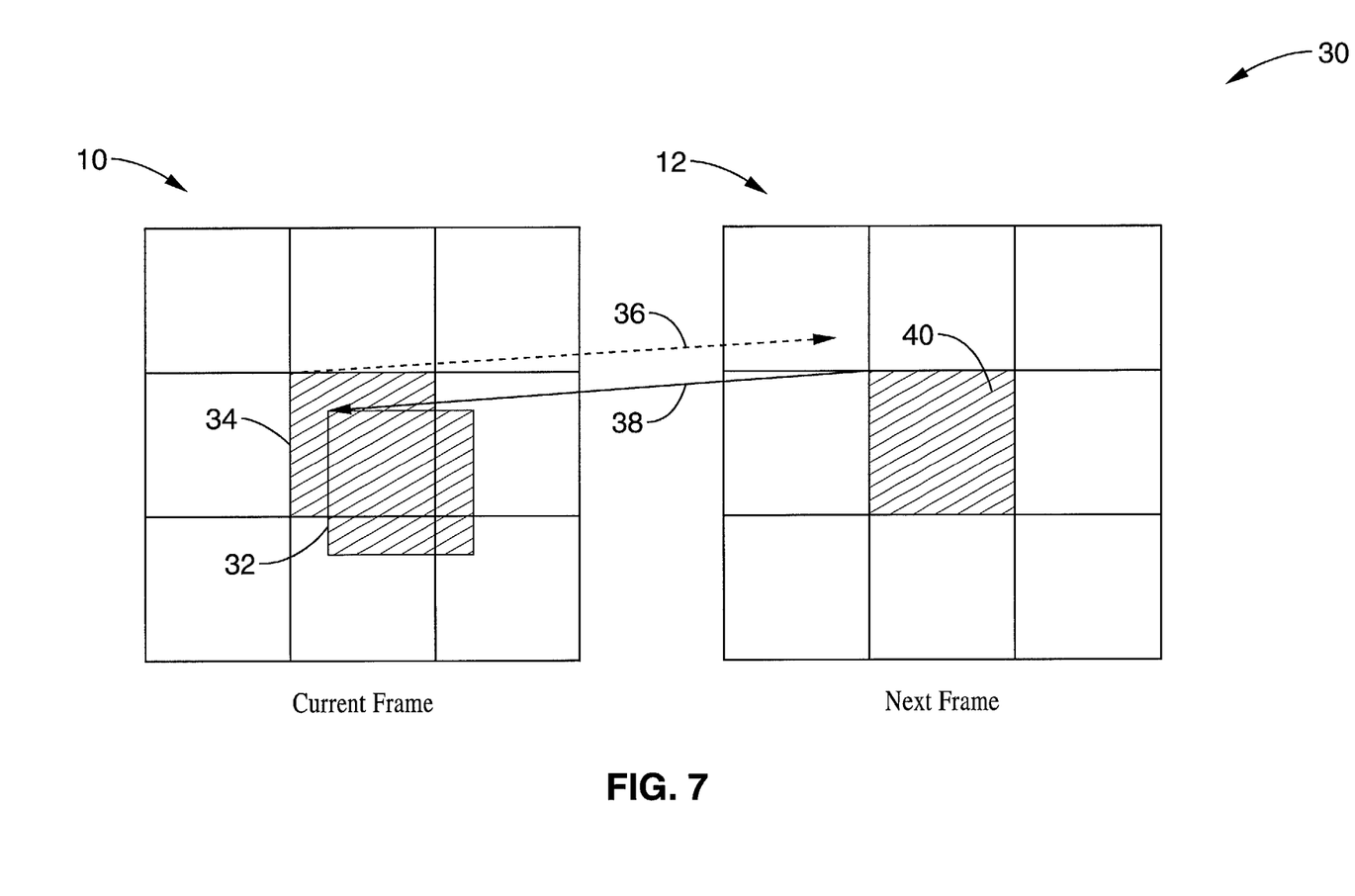
FIG. 7 is a macroblock vector diagram depicting a forward motion vector assignment to the nearest macroblock in the current frame to form a backward motion vector with the same magnitude but opposite in direction of the forward motion vector according to an aspect of the present invention.

As shown in FIG. 7, a single frame distanced backward motion vector of a current frame 10 is obtained from a single frame distanced forward motion vector of the next frame 12 in the following manor. Let the given integer pel forward motion vector 38 of a macroblock 40 in the next frame 12 be the two dimensional vector (u,v). And let the top left pixel of the macroblock 40 be located at (x,y). Therefore, the macroblock 40 is moved from the 16×16 pixels 32 located at (x+u,y+v) in the current frame with the forward motion vector (u,v).

Since motion is relative, we interpret that the 16×16 pixels 32 moves from the position (x+u,y+v) in the current frame to the next frame at the position (x,y) with the backward motion vector (−u,−v). However the position (x+u,y+v) is not necessarily located at the top left corner of macroblock. To obtain the backward motion vector of a macroblock, we assign the backward motion vector (−u,−v) to the macroblock whose top left corner $(X_m,y_m)$ is nearest to (x+u,y+v). Therefore, $$x_m=16*((x+u+8)/16),$$

$$y_m=16*((y+v+8)/16),$$

where "*" is integer multiply, and "/" is integer divide with truncation as defined in the C programming language.

A side effect of the assignment process is that there is no guarantee that each macroblock in the current frame will be assigned with one and only one backward motion vector. It is possible that some macroblocks may be assigned with multiple backward motion vectors and some macroblocks may not be assigned with any backward motion vectors at all. For example in FIG. 8, macroblock 1 of frame $B_2$ was not assigned with any backward motion vector. Therefore, the present invention provides a method for detecting which macroblocks remain unassigned with any backward motion vector. Backward motion vectors may then be assigned to these unassigned macroblocks by any convenient means, such as by using conventional backward motion vector computations. In addition, a method is provided for selecting one of the backward motion vectors when multiple assignments are made to the same macroblock.

FIG. 9 illustrates backward motion vectors, wherein the motion vector $b_2$ is actually $b_{31}$. An approximation of the motion vector $b_1$ is obtained by adding the vector $b_{31}$ and $b_{32}$. The vector $b_{31}$ is selected because it originates at the same position as the motion vector $b_1$, while motion vector $b_{32}$ is selected because the starting point of $b_{32}$ is the nearest to the end point of vector $b_{31}$ among all single frame distanced backward motion vectors in frame $B_2$. The approximation of $b_2$ is further improved by selecting the motion vector which minimizes the sum of absolute differences (SAD) within +/−2 horizontal times +/−1 pels from the vector $b_{31}+b_{32}$ to form $b_1$.

As previously described, not every valid backward motion vector of every macroblock may be determined utilizing the present method. For example, the vector $b_3$ and $b_4$ in FIG. 10 cannot be determined because the motion vector $b_{23}$ for constructing them is not valid and therefore not available. When a valid backward motion vector of a macroblock cannot be determined by the above method, the backward motion vectors should not be utilized for encoding that macroblock, and they can be generated by any convenient means. Furthermore, it will be remembered that each macroblock in the frame could be assigned with multiple backward motion vectors. Wherein one of the backward motion vectors may be selected for use, such as the backward motion vector which most closely approximates the resultant location, or a combination of the vectors may be computed and utilized and assigned to the macroblock.

One method of detecting unassigned macroblocks is by preassigning all macroblocks with an invalid motion vector, such as pointing outside the frame, prior to the following iterative process, wherein the unassigned macroblock may be easily detected. The iterative process of determining the backward motion vectors is then executed for each of the macroblocks within the next frame.

For every macroblock in the next frame at (x,y), its forward motion vector (u,v) is converted into a new backward motion vector (−u,−v). Then the new backward motion vector is used to replace the old backward motion vector of the macroblock at $(x_m,y_m)$ in the current frame. Consequently only one backward motion vector, which may be valid or invalid, is kept at any one time for each macroblock in the current frame.

Once found, the single-frame distance backward motion vectors can be utilized to generate the multi-frame backward motion vectors. Let $b_{im}$ be the single frame distanced backward motion vector of the i-th macroblock of the m-th frame to the (m+1)-th frame. Let $b_{imn}$ be the backward motion vector of the i-th macroblock of the m-th frame to the n-th frame. Consequently, we arrive at $b_{im}=b_{im(m+1)}$.

An iterative linking process can be utilized within the present invention to find multi-frame backward motion vectors $b_{imn}$ of the i-th macroblock of the m-th frame to the n-th frame by linking the motion vectors in between successive frames. Let the i-th macroblock of the m-th frame be located at $(x_{im},y_{im})$.

The iterative process is first initialized prior to the determination of backward motion vectors from forward motion vectors. The single-frame distanced motion vector $b_{im}$ is obtained and it is designated as $b_{im(m+1)}$, and then k is initialized as k=(m+1). If $b_{im}$ is an invalid motion vector the iterative process is continued. If $b_{im}$ is not an invalid motion vector an invalid vector is assigned to $b_{imn}$ and the linking process is terminated.

The multi-frame distanced backward motion vector $b_{imn}$ is iteratively found. Once a valid $b_{imk}=(u_{imk},v_{imk})$ is found, a motion vector $b_{im(k+1)}$ is constructed from $b_{imk}$ by using the single frame distanced backward motion vector $b_{jk}$ of the j-th macroblock of k-th frame, where the j-th macroblock is located at $(x_{jk},y_{jk})$ and $$x_{jk}=16*((x_{im}+u_{imk}+8)/16),$$

$$y_{jk}=16*((y_{im}+v_{imk}+8)/16),$$

and "*" is integer multiply, and "/" is integer divide with truncation as defined in the C programming language. If $b_{jk}$ is an invalid motion vector, it is assigned an invalid vector to $b_{imn}$ and the process is terminated. If $b_{jk}$ is a valid motion vector, it is assigned $$b_{im(k+1)}=b_{imk}+b_{jk}.$$

The value k is increased by one, and the iterative process above is repeated until $b_{imn}$ is assigned. Then after $b_{imn}$ is assigned, that is if $b_{imn}$ is a valid motion vector, it is further improved by replacing it with the motion vector which minimizes the sum of absolute differences (SAD) within a +/−2 horizontal times +/−1 pels from $b_{imn}$. If $b_{imn}$ is not a valid motion vector, the backward motion vector should not be used to encode the corresponding macroblock.

Figure 11:
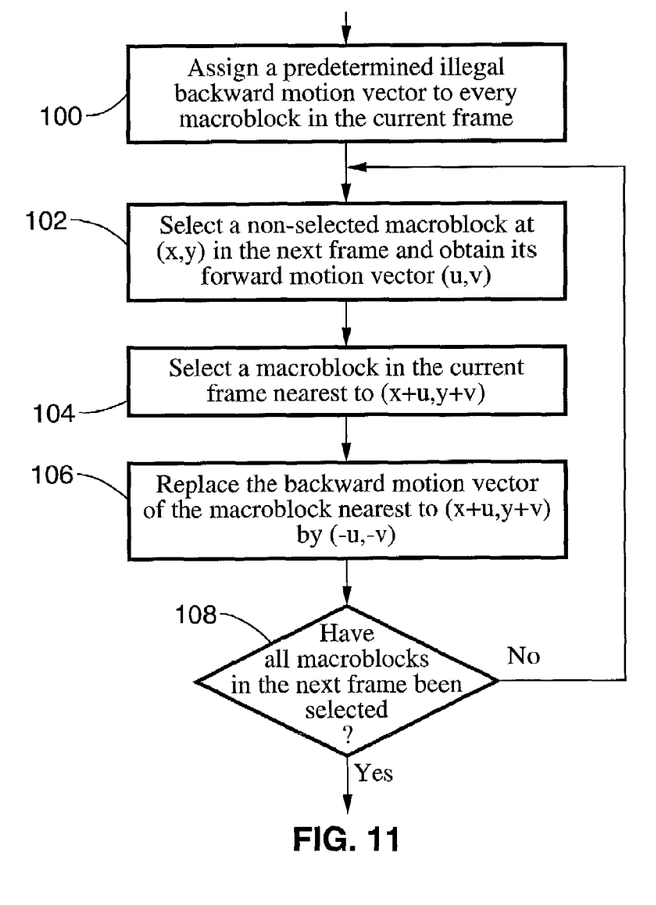
FIG. 11 is a flowchart of the general backward estimation method according to an embodiment of the present invention.

FIG. 11 depicts generalized steps according to the present invention. To provide a simple means of detecting whether a backward motion vector has been validly assigned within the iterative process, a predetermined invalid motion vector is first assigned to all macroblocks, as shown in block 100. For example, in the current implementation for MPEG-2, the invalid motion vector may comprise a motion vector that points outside of a frame. It will be appreciated that the detection process is not required for every application, and when utilized it may be implemented in a number of ways that will be obvious to one of ordinary skill in the art.

A previously non-selected macroblock is selected at (x,y) in the next frame and its two dimensional forward motion vector (u,v) is obtained as per block 102. The macroblock may be of any size, such as one comprising 16×16 pixels. A macroblock is selected from within the current frame that is nearest to a location (x+u,y+v), as represented by block 104. Then the backward motion vector of the macroblock nearest to (x+u,y+v) may be replaced by (−u,−v) as represented by block 106. It should be appreciated that alternative methods may be utilized when multiple corresponding forward motion vectors are available, such as selecting the closest one, or combining the vectors in a computation to arrive at the backward motion vector. The above steps, as shown in blocks 102, 104, 106 are then iteratively performed until macroblocks in the next frame have been selected, as represented by block 108. Linking may be performed on the backward motion vectors as described for use within a multi-frame video sequence.

Accordingly, it will be seen that the inventive method for estimating backwards motion vectors from forward motion vectors that can be implemented with numerous variations which will be obvious to those skilled in the art. It will be appreciated that the particular steps and order of steps may be implemented in a number of alternative ways by one of ordinary skill in the art without departing from the teachings of the invention as claimed.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of estimating multi-frame backward motion vectors in a sequence of video frames, comprising:
   for any frame, deriving a backward motion vector from a nearest neighbor forward motion vector; and
   linking said backward motion vector to multiple frame backward motion vectors within a video sequence;
   wherein said linking comprises iterative linking to find the backward motion vectors $b_{imn}$ of the i-th macroblock of the m-th frame to the n-th frame by linking the motion vectors in between successive frames;
   wherein $b_{im}$ represents the backward motion vector of the i-th macroblock of the m-th frame to the (m+1)-th frame; and
   wherein $b_{imn}$ represents the backward motion vector of the i-th macroblock of the m-th frame to the n-th frame.

2. A method as recited in claim 1, wherein said step of deriving said backward motion vector comprises:
   identifying an area of the previous frame that when moved in a backward direction results in a given macroblock; and
   assigning the backward motion vector of said area to the macroblock nearest to said area.

3. A method as recited in claim 2, further comprising:
   detecting the macroblocks associated with any backward motion vectors that could not be generated from forward motion vectors and generating them conventionally.

4. A method as recited in claim 1, wherein said step of detecting the macroblocks associated with any backward motion vectors that could not be generated from forward motion vectors, comprises:
   assigning a predetermined illegal backward motion vector to every macroblock in the current frame prior to determining backward motion vectors, wherein unassigned macroblocks retain the illegal backward motion vector and can be detected.

5. A method as recited in claim 1, wherein said linking comprises:
   initializing the iterative process;
   designating the backward motion vector $b_{im}$ as $b_{im(m+1)}$;
   assigning an invalid backward motion vector to $b_{imn}$ if $b_{im}$ is not invalid and terminating the linking process;
   initializing k as k=(m+1);
   continuing the iterative process until a valid backward motion vector $b_{imk}=(u_{imk}, v_{imk})$ is found;
   constructing a backward motion vector $b_{im(k+1)}$ from $b_{imk}$, when a valid $b_{imk}$ is found, by using the backward motion vector $b_{jk}$ of the j-th macroblock of k-th frames where the j-th macroblock is located at $(x_{jk}, y_{jk})$ and $y_{jk}=16*((y_{im}+v_{imk}+8)/16)$, $x_{jk}=16*((x_{im}+u_{imk}+8)/16)$;
   assigning an invalid backward motion vector to $b_{imn}$ if $b_{jk}$ is an invalid backward motion vector and terminating the linking process;
   assigning backward motion vector $b_{im(k+1)}=b_{imk}+b_{jk}$, if $b_{jk}$ is a valid backward motion vector; and
   increasing the value of k and repeating the iterative process above until backward motion vector $b_{imn}$ is assigned;
   wherein $b_{im}=b_{im(m+1)}$; and wherein the i-th macroblock of the m-th frame is located at $(x_{im}, y_{im})$.

6. A method as recited in claim 1, further comprising:
   improving a valid backward motion vector $b_{imn}$ by replacing it with the backward motion vector which minimizes the sum of absolute differences (SAD).

7. A method as recited in claim 6, further comprising:
   minimizing the sum of absolute differences (SAD) within a +/−2 horizontal times +/−1 pels from $b_{imn}$.

8. A method of estimating backward motion vectors from available forward motion vector fields between successive frames, comprising:
   (a) identifying an area of a previous frame that when moved in a backward direction results in a given macroblock; and
   (b) assigning a backward motion vector of said area to the macroblock nearest to said area;
   (c) linking the backward motion vector to multiple frame distanced backward motion vectors;

wherein said linking comprises iterative linking to find the backward motion vectors $b_{imn}$ of the i-th macroblock of the m-th frame to the n-th frame by linking the motion vectors in between successive frames;

wherein $b_{im}$ represents the backward motion vector of the i-th macroblock of the m-th frame to the (m+1)-th frame; and wherein $b_{imn}$ represents the backward motion vector of the i-th macroblock of the m-th frame to the n-th frame.

9. A method as recited in claim 8, further comprising:
repeating steps (a) and (c) for each macroblock in the next frame to estimate backward motion vectors for a frame.

10. A method as recited in claim 9, further comprising:
detecting the macroblocks associated with any backward motion vectors that could not be generated from forward motion vectors and generating them conventionally.

11. A method as recited in claim 10, wherein said step of detecting the macroblocks associated with any backward motion vectors that could not be generated from forward motion vectors, comprises:
assigning a predetermined illegal backward motion vector to every macroblock in the current frame prior to determining backward motion vectors, wherein unassigned macroblocks retain the illegal backward motion vector and can be detected.

12. A method as recited in claim 8, wherein said backward motion vector estimation is configured for being performed orthogonal to conventional computation speed enhancement methods.

13. A method as recited in claim 8, wherein said backward motion vector estimation is performed for MPEG-2 encoding and decoding operations.

14. A method as recited in claim 8, wherein said linking comprises:
initializing the iterative process;
designating the backward motion vector $b_{im}$ as $b_{im(m+1)}$;
assigning an invalid backward motion vector to $b_{imn}$ if $b_{im}$ is not invalid and terminating the linking process;
initializing k as k=(m+1);
continuing the above iterative process until a valid backward motion vector $b_{imk}=(u_{imk},v_{imk})$ is found;
constructing a backward motion vector $b_{im(k+1)}$ from $b_{imk}$, when a valid $b_{imk}$ is found, by using the backward motion vector $b_{jk}$ of the j-th macroblock of k-th frame, where the j-th macroblock is located at $(x_{jk},y_{jk})$ and $y_{jk}=16*((y_{im}+v_{imk}+8)/16$, $x_{jk}=16*((x_{im}+u_{imk}+8)/16)$;
assigning an invalid backward motion vector to $b_{imn}$ if $b_{jk}$ is an invalid backward motion vector and terminating the linking process;
assigning backward motion vector $b_{im(k+1)}=b_{imk}+b_{jk}$, if $b_{jk}$ is a valid backward motion vector; and
increasing the value of k and repeating the iterative process above until backward motion vector $b_{imn}$ is assigned;
wherein $b_{im}=b_{im(m+1)}$; and
wherein the i-th macroblock of the m-th frame is located at $(x_{im},y_{im})$.

15. A method of estimating backward motion vectors from forward motion vector fields between successive frames, comprising:
(a) for any frame, selecting a previously unselected macroblock at a location (x,y) in the next frame and obtaining a forward motion vector (u,v);
(b) selecting a macroblock in the current frame nearest to (x+u,y+v);
(c) assigning a backward motion vector for the macroblock nearest to (x+u, y+v) as the vector (−u,−v); and
(d) linking the backward motion vector to multiple frame backward motion vectors;
wherein said linking comprises iterative linking to find the backward motion vectors $b_{imn}$ of the i-th macroblock of the m-th frame to the n-th frame by linking the motion vectors in between successive frames;

wherein $b_{im}$ represents the backward motion vector of the i-th macroblock of the m-th frame to the (m+1)-th frame; and wherein $b_{imn}$ represents the backward motion vector of the i-th macroblock of the m-th frame to the n-th frame.

16. A method as recited in claim 15, further comprising repeating steps (a) through (d) for each macroblock in the next frame.

17. A method as recited in claim 15, further comprising:
detecting the macroblocks associated with any backward motion vectors that could not be generated from forward motion vectors and generating them conventionally.

18. A method as recited in claim 17, wherein said step of detecting the macroblocks associated with any backward motion vectors that could not be generated from forward motion vectors, comprises:
assigning a predetermined illegal backward motion vector to every macroblock in the current frame prior to determining backward motion vectors, wherein unassigned macroblocks retain the illegal backward motion vector.

19. A method as recited in claim 15, wherein said backward motion vector estimation is configured for being performed orthogonal to conventional computation speed enhancement methods.

20. A method as recited in claim 15, wherein said backward motion vector estimation is performed for MPEG-2 encoding and decoding operations.

21. A method as recited in claim 19, wherein said linking comprises:
initializing an iterative process;
designating the backward motion vector $b_{im}$ as $b_{im(m+1)}$;
assigning an invalid backward motion vector to $b_{imn}$ if $b_{im}$ is not invalid and terminating the linking process;
initializing k as k=(m+1);
continuing the iterative process until a valid backward motion vector $b_{imk}=(u_{imk},v_{imk})$ is found;
constructing a backward motion vector $b_{im(k+1)}$ from $b_{imk}$, when a valid $b_{imk}$ is found, by using the backward motion vector $b_{jk}$ of the j-th macroblock of k-th frame, where the j-th macroblock is located at $(x_{jk},y_{jk})$ and $y_{jk}=16*((y_{im}+v_{imk}+8)/16)$, $x_{jk}=16*((x_{im}+u_{imk}+8)/16)$;
assigning an invalid backward motion vector to $b_{imn}$ if $b_{jk}$ is an invalid backward motion vector and terminating the linking process;
assigning backward motion vector $b_{im(k+1)}=b_{imk}+b_{jk}$, if $b_{jk}$ is a valid backward motion vector; and
increasing the value of k and repeating the iterative process above until backward motion vector $b_{imn}$ is assigned;
wherein $b_{im}=b_{im(m+1)}$;
wherein the i-th macroblock of the m-th frame is located at $(x_{im},y_{im})$.

22. A method as recited in claim 15, further comprising improving a valid motion vector $b_{imn}$ by replacing it with the motion vector which minimizes the sum of absolute differences (SAD).

23. A method as recited in claim 22, further comprising minimizing the sum of absolute differences (SAD) within a +/−2 horizontal times +/−1 pels from $b_{imn}$.

24. A method of estimating multi-frame backward motion vectors in a video sequence, comprising:
for any frame in a sequence of frames containing said frame and a previous frame, identifying an area of the previous frame that when moved in a backward direction results in a given macroblock;
assigning a backward motion vector of said area to the macroblock nearest to said area; and
linking said backward motion vector to multiple frame backward motion vectors;
wherein said linking comprises iterative linking to find the backward motion vectors $b_{imn}$ of the i-th macroblock of the m-th, frame to the n-th frame by linking the motion vectors in between successive frames;
wherein $b_{im}$ represents the backward motion vector of the i-th macroblock of the m-th frame to the (m+1)-th frame; and
wherein $b_{imn}$ represents the backward motion vector of the i-th macroblock of the m-th frame to the n-th frame.

25. A method as recited in claim 24, wherein said backward motion vector estimation is performed for MPEG-2 encoding and decoding operations.

26. A method as recited in claim 24, further comprising improving a valid backward motion vector $b_{imn}$ by replacing it with the motion vector which minimizes the sum of absolute differences (SAD).

27. A method as recited in claim 26, further comprising minimizing the sum of absolute differences (SAD) within a +/−2 horizontal times +/−1 pels from $b_{imn}$.

28. A method of estimating multi-frame backward motion vectors, comprising:
for any frame in a sequence of frames containing said frame and a previous frame, identifying an area of the previous frame that when moved in a backward direction results in a given macroblock; and
assigning a backward motion vector of said area to the macroblock nearest to the said area;
linking the backward motion vector to multiple frame backward motion vectors by iterative linking to find the backward motion vectors $b_{imn}$ of the i-th macroblock of the m-th frame to the n-th frame by linking the backward motion vectors in between successive frames;
wherein $b_{im}$ represents the backward motion vector of the i-th macroblock of the m-th frame to the (m+1)-th frame; and
wherein $b_{imn}$ represents the backward motion vector of the i-th macroblock of the m-th frame to the n-th frame.

29. A method of estimating multi-frame backwards motion vectors, comprising:
selecting an unselected macroblock at a location (x,y) in the next frame and obtaining an associated forward motion vector (u,v);
selecting a macroblock in the current frame nearest to (x+u,y+v); and
assigning a backward motion vector for the macroblock nearest to (x+u,y+v) as the vector (−u,−v);
linking the backward motion vector to multiple frame backward motion vectors by iterative linking to find the backward motion vectors $b_{imn}$ of the i-th macroblock of the m-th frame to the n-th frame by linking the backward motion vectors in between successive frames;
wherein $b_{im}$ represents the backward motion vector of the i-th macroblock of the m-th frame to the (m+1)-th frame; and
wherein $b_{imn}$ represents the backward motion vector of the i-th macroblock of the m-th frame to the n-th frame.

30. A method of estimating multi-frame backward motion vectors, comprising:
selecting an unselected macroblock at a location (x,y) in the next frame and obtaining its forward motion vector (u,v);
selecting a macroblock in the current frame nearest to (x+u,y+v); and
assigning a backward motion vector for the macroblock nearest to (x+u,y+v) as the vector (−u,−v);
linking the backward motion vector to multiple frame backward motion vectors by
initializing an iterative process;
designating the backward motion vector $b_{im}$ as $b_{im(m+1)}$;
assigning an invalid backward motion vector to $b_{imn}$ if $b_{im}$ is not invalid and terminating the linking process;
initializing k as k=(m+1)
continuing the iterative process until a valid backward motion vector $b_{imk}=(u_{imk},v_{imk})$ is found;
constructing a backward motion vector $b_{im(k+1)}$ from $b_{imk}$, when a valid $b_{imk}$ is found, by using the backward motion vector $b_{jk}$ of the j-th macroblock of k-th frame, where the j-th macroblock is located at $(x_{jk},y_{jk})$ and $y_{jk}=16*((y_{im}+v_{imk}+8)/16)$, $x_{jk}=16*((x_{im}+u_{imk}+8)/16)$;
assigning an invalid backward motion vector to $b_{imn}$ if $b_{jk}$ is an invalid backward motion vector and terminating the linking process;
assigning backward motion vector $b_{im(k+1)}=b_{imk}+b_{jk}$, if $b_{jk}$ is a valid backward motion vector; and
increasing the value of k and repeating the iterative process above until backward motion vector $b_{imn}$ is assigned;
wherein $b_{im}$ represents the backward motion vector of the i-th macroblock of the m-th frame to the (m+1)-th frame;
wherein $b_{imn}$ represents the backward motion vector of the i-th macroblock of the m-th frame to the n-th frame;
wherein $b_{im}=b_{im(m+1)}$;
wherein the i-th macroblock of the mm-th frame is located at $(x_{im},y_{im})$.

* * * * *

UNITED STATES PATENT AND TRADEMARK OFFICE
CERTIFICATE OF CORRECTION

PATENT NO. : 7,027,510 B2
APPLICATION NO. : 10/112623
DATED : April 11, 2006
INVENTOR(S) : Cheung Auyeung Page 1 of 1

It is certified that error appears in the above-identified patent and that said Letters Patent is hereby corrected as shown below:

In the Specification

Column 4, line 59, change "vector" to --vectors--.
Column 4, line 64, change "manor" to --manner--.
Column 6, line 29, change "is an invalid" to --is not an invalid--.
Column 6, line 30, change "is not an invalid" to --is an invalid--.
Column 6, line 31, change "vector" to --vector,--.

In the Claims

Column 8, line 32, Claim 5, change "is not invalid" to --is invalid--.
Column 9, line 39, Claim 14, change "is not invalid" to --is invalid--.
Column 10, line 43, Claim 21, change "is not invalid" to --is invalid--.
Column 12, line 29, Claim 30, change "is not invalid" to --is invalid--.

Signed and Sealed this
Thirty-first Day of March, 2015

Michelle K. Lee
*Director of the United States Patent and Trademark Office*